UNITED STATES PATENT OFFICE.

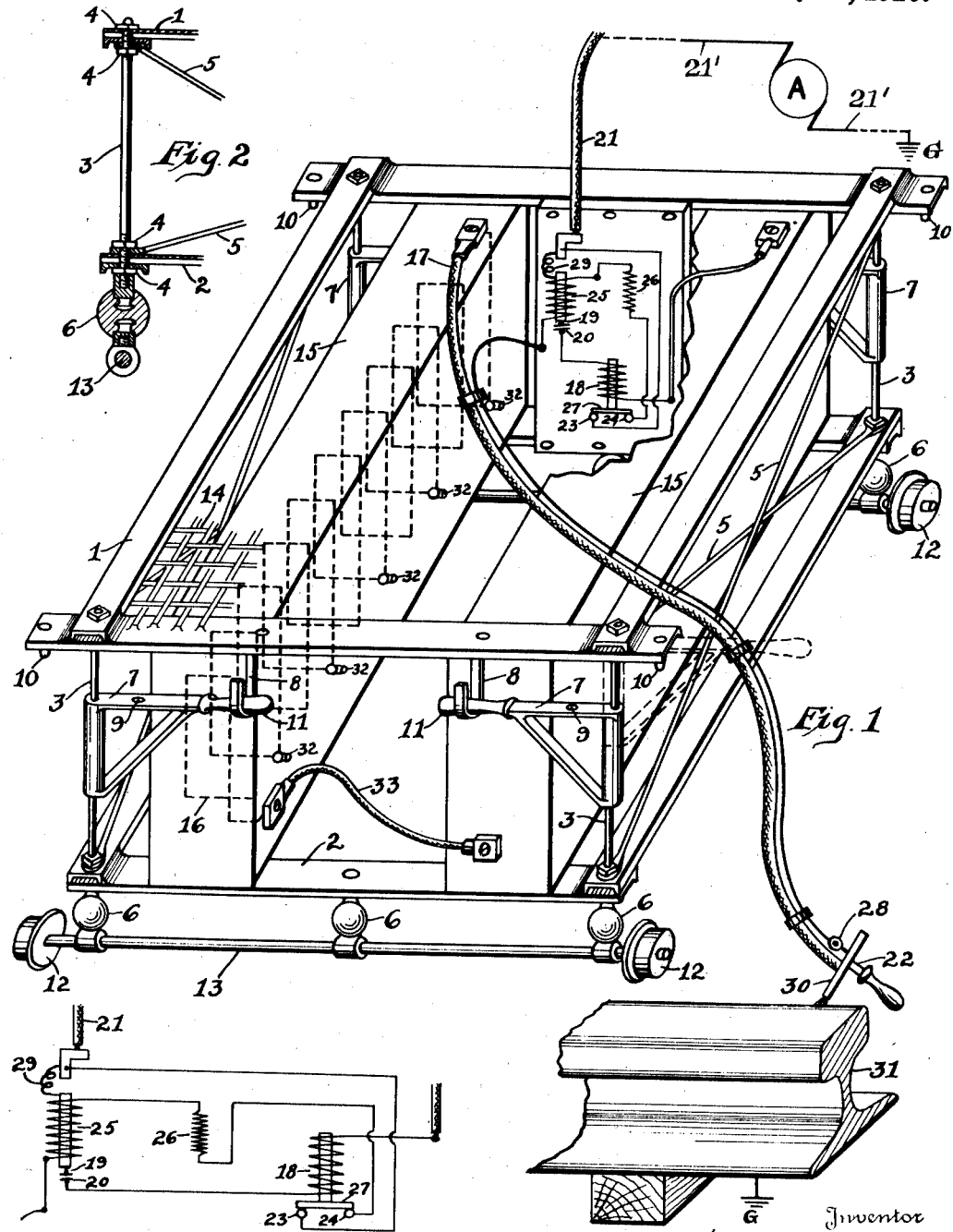

WILLIAM P. BOVARD, OF MANSFIELD, OHIO, ASSIGNOR TO THE OHIO BRASS COMPANY, OF MANSFIELD, OHIO, A CORPORATION OF NEW JERSEY.

ELECTRIC WELDING DEVICE.

1,341,293. Specification of Letters Patent. Patented May 25, 1920.

Application filed October 24, 1919. Serial No. 332,929.

*To all whom it may concern:*

Be it known that I, WILLIAM P. BOVARD, a citizen of the United States of America, residing at Mansfield, in the county of Richland and State of Ohio, have invented certain new and useful Improvements in Electric Welding Devices, of which the following is a specification.

My invention relates to an electric control mechanism and more particularly to that form of device adapted to reduce the flow of current and control the same for use in electric welding.

One object of my invention is to provide a device which is compact, light and easily portable whereby the current from a source of large supply can be reduced to the proper amount for welding and maintained reasonably constant. This is particularly beneficial when it is desired to weld in mines where the room is limited and conditions to be met are severe.

Another object of my invention is to provide a device by which the current supply can be controlled at the electrode holder which is usually located at a distance from the device proper.

My invention consists in the combination and arrangement of parts substantially as hereinafter fully described and claimed. The accompanying drawings show the device as particularly adapted for rail bond welding, receiving current from a trolley wire, and will be so described although it is applicable to other classes of welding.

In the drawing:—

Figure 1 shows my device in perspective in its complete form and arrangement of parts.

Fig. 2 shows one of the corner or spacing posts and the manner of connecting it to the frame member.

Fig. 3 shows a diagrammatic view of the control switches forming a part of my device and enlarged as compared with the same shown in Fig. 1.

My invention is particularly adapted for use in welding, as for instance in the application of rail bonds to rails, welding splice bars in place or filling up low spots in rails, etc., and when the source of electric supply is the trolley wire and ground and the amount of current available is much greater than required.

Under such conditions it is desirable to have a device which will reduce the amount of current which can be made available at the arc and which cannot exceed a maximum amount as determined by the control apparatus. It is also desirable to be able to control the arc as to "off" and "on" by the operator of the arc and this requires mechanism under his control and adjacent to the point of application which is the electrode holder. These features, together with lightness and compactness, together with others more fully set forth in my further description, are incorporated in my invention.

In Fig. 1 I show an upper frame 1 and a lower frame 2 composed preferably of structural iron on account of its lightness and strength for my purpose. For simplicity and rigidity I prefer to weld the corners of the four sides together to form a one-piece frame to which there is no yielding of the sides relatively to each other, but which maintains its corner angles rigid. The pieces forming the sides of the frame can be lapped and welded as shown or other well known joints used such as the welded butt joint or the ordinary lap joint.

To maintain the frames 1 and 2 in a relatively spaced relation to each other, I provide spacing members 3 which are threaded at both ends to provide means for adjusting the distance between the frames 1 and 2. Ordinarily the spacing members are secured to the frame as shown in Fig. 2 by means of running nuts 4 top and bottom of the frame members. In order to further increase the rigidity of the frame I provide brace members 5 which are shown as secured in place by the spacing bars 3 and nuts 4.

As the trolley circuit to which the device is to be connected is a grounded circuit, it is advisable to insulate the frame from the ground and this I do by providing insulating members 6 which are shown as secured to the lower end of the spacing members and to the frame.

In order to conveniently carry the device from point to point I provide handles 7 which may be rotated back and reduce the amount of space taken up by the device which is very important in mines and other crowded places. I show the handles as mounted to rotate on the spacing members and means in the form of hooks 8 for receiving the handles when rotated back, out of use. To bring the handles into use it is only necessary to lift them up as they are movable longitudinally of the spacing member, swing them around into position and raise them farther until the recess 9 engages the pin 10 when they are locked from further rotation. The dotted lines shows the lower right hand handle in the service or operating position. To protect the workmen from injury when moving the device and with current on the device I provide insulated handle grips 11.

As there will be times when it is convenient and desirable to mount the device on the track and move it along the same, I provide wheels 12 mounted on a shaft or axle 13 which in turn is secured to the insulators 6.

To protect the electrical apparatus held by the device from falling coal and other objects and protect the workmen and others from contacting with the electrical apparatus, I provide a heavy screen 14 which for clearness is shown only in one corner of the top frame but which is made to cover the entire top of the device and the sides likewise.

The electrical features of my invention comprise resistance units 15—15 which contain the resistance element 16. The unit may be of any required number and the resistance element 16 arranged in any well known manner to give the proper current value at the welding arc. I have shown and represented the elements as connected in series and one end of the connected elements attached to a cable 17. The other end of the connected resistance elements is connected to the solenoid of an overload switch 18 and then to the make and break contact 19—20, which are normally open, of a circuit breaker and which in turn connects to the cable 21 which is arranged to connect to a trolley wire or other source of current supply. One end of the cable 17 is provided with an electrode holder 22.

The above description completes the main current circuit and I will now describe the control circuit by means of which the supply of current to the electrode is cut "off" or "on" by the operator at will and the current is automatically cut off when the current exceeds a predetermined amount due to a fluctuation in the trolley voltage or other causes.

Leading from the contact at the end of the cable 21 is a circuit which is connected to the make and break contact 23 of the overload switch 18. From the terminal 24 the control circuit leads to the solenoid 25, through the interposed resistance 26; the resistance being adjusted to the voltage at the source to reduce the current value in the control circuit to a very small amount. The contacts 23 and 24 are connected by means of the make and break contactor 27 and are normally closed. The control circuit after passing through the solenoid 25 leads to the electrode holder 22 with a hand control switch 28 interposed adjacent the holder.

In order to show how the electric circuit would be completed, A shows diagrammatically a generator and the cable 21 is connected to the generator line 21' and the other generator line 22'' is connected to the ground G thus completing the circuit as in the case of welding a rail. Or the generator line 21'' could be connected to the rail 31 direct and secure the same results. This invention could also be applied to the welding of various objects by substituting such objects for the rail 31 and connecting the line 21'' thereto.

The operation of the electrical apparatus just described is as follows:—

The main circuit consists of the cable 21 connected to the trolley and through which the current flows, through the connector 29 to the make and break contact 19—20, then through the solenoid 18, resistance element 16, cable 17 and electrode 30 to the rail 31 and then to the ground G. The circuit in passing through the solenoid 18 does not operate the make and break contact 23—24—27 unless the current flowing in the main circuit exceeds a predetermined value in which case the contacts are separated through the raising of the armature and contactor 27 thereby opening the control circuit.

The control circuit functions largely to operate the contact 19—20 of the circuit breaker switch. When the operator is ready to weld he first connects the cable 21 to the trolley or other source. He then applies the electrode 30 to the rail 31 and closes the switch 28. Upon closing the switch 28 the control circuit is completed between the trolley and the ground and the current flows through the solenoid 25, magnetizing the same and closing the circuit between contacts 19—20 thereby completing the main current circuit. Upon opening the switch 28 the solenoid 25 is demagnetized and the contacts 19—20 open and current is cut off from the electrode.

In order to be able to adjust the resistance element to vary the current forming the welding arc, I provide connectors 32 at different points on the resistance elements and to which the cable 33 may be attached as desired, thereby increasing or decreasing the amount of current at the arc.

It will be seen that I have arranged a simple, compact device which incorporates many valuable features for a device of the character described and what I claim is:—

1. In electric welding, an arc welding circuit connected to a source of supply, a resistance element in the circuit to control the current therein, an electrode in the circuit for forming an arc, an electrically operated contacting device in the circuit for opening and closing the circuit, a separate control circuit connected to the source of supply for controlling the electrically operated contact device and an electrically operated switch device for opening and closing the control circuit and operated by the current forming the arc when the current exceeds a predetermined amount.

2. In electric welding, an arc welding circuit connected to a source of supply, a resistance element in the circuit, an electrode in the circuit adapted to form an arc upon making and breaking the contact at that point, a contact device in the circuit for opening and closing the arc circuit at will of the operator, a control circuit connected to the source of supply and having interposed therein a solenoid for operating the contact device in the arc welding circuit, a normally closed contact device in the control circuit which is opened by a solenoid in the arc welding circuit whenever the current in the welding circuit exceeds a predetermined amount.

3. In electric welding, an arc welding circuit connected to a source of supply, a resistance element in the circuit, an electrode in the circuit adapted to form an arc upon making and breaking the circuit at that point, a contact device in the circuit for opening and closing the arc circuit at will of the operator, a control circuit connected to the source of supply and having interposed therein a solenoid for operating the contact device in the arc welding circuit, a normally closed contact device in the control circuit which is opened by a solenoid in the arc welding circuit whenever the current in the welding circuit exceeds a predetermined amount, and manually operated means for controlling the current in the control circuit for opening and closing the contact device in the arc welding circuit.

4. In electric welding, an arc welding circuit connected to a source of supply, an electrode in the circuit adapted to form an arc upon making and breaking the circuit at that point, a contact device in the circuit for opening and closing the arc circuit at will of the operator, a control circuit for operating the contact device and receiving current from the same source as the welding circuit and provided with a plurality of means for operating the contact device in the welding circuit, one means being manually controlled and the other means being automatically controlled by the current in the welding circuit.

5. In electric welding, a welding circuit and a control circuit each connected to the same source of supply, electro-responsive means in the welding circuit for opening and closing the control circuit automatically with a predetermined current change in the welding circuit, electro-responsive means in the control circuit for opening and closing the welding circuit and manually operated means in the control circuit for operating the electro-responsive means in the control circuit.

6. In electric welding, a welding arc circuit arranged to be opened and closed at a point external to the arc, a control circuit adapted to be closed at the arc, electro-responsive means in the control circuit arranged to open or close the welding circuit after the welding circuit has been closed at the point of arc, and means in the control circuit to operate the electro-responsive device after the welding and control circuits have been closed at the arc.

7. In electric welding, a welding arc circuit comprising a source of electro-motive force and two relatively movable terminals between which an arc is to be drawn; a current controlling mechanism, a switch for opening and closing the welding circuit and operated by electro-responsive mechanism in the auxiliary circuit and an electro-responsive mechanism operated by current in the welding circuit to open and close the auxiliary circuit, all in the welding circuit; an auxiliary circuit in shunt around the current control mechanism, switch in the welding circuit and electro-responsive mechanism in the welding circuit; said auxiliary circuit adapted to be energized and close the switch in the welding circuit when the movable terminals are contacted.

8. In electric welding, a welding arc circuit to carry heavy current for welding and an auxiliary or control circuit to carry relatively small current, in shunts; means in the welding circuit for controlling the current magnitude; two relatively movable terminals between which a welding arc is to be drawn; means in the welding circuit for opening or closing the welding circuit at a point remote to the point of welding; means in the auxiliary circuit adjacent the point of welding for controlling the means in the welding circuit when the circuit is closed at the point of welding.

9. In electric welding, an arc welding circuit connected to a source of supply, a current control mechanism in the circuit, two relatively movable terminals between which a welding arc is to be drawn, an electro-responsive contact device in the circuit for opening and closing the welding circuit at will of the operator, a control circuit connected to the source of supply and to the electro-responsive device and manually operated means in the control circuit and adjacent the point of welding for controlling the operation of the electro-responsive device to open and close the welding circuit.

10. In electric welding, a welding circuit connected to a source of supply and adapted to be closed at the point of welding before current flows therethrough, two relatively movable terminals between which welding is to take place, and electro-responsive means for opening the welding circuit at a point remote from the point of welding at a predetermined value of the current flowing in the welding circuit.

11. A portable device adapted to support electric welding control apparatus comprising a frame, handle secured to the frame adapted to swing horizontally (when the frame is in normal position) into and out of operative position at will and move vertically to engage holding means, and means to hold the handles in either position.

12. A portable device adapted to support electric welding control apparatus comprising a frame consisting of upper and lower members, means separating the frame members and adapted to adjust the separation between the frame members, handles pivotally secured to the separating means to swing in a horizontal plane and means to hold the handles in and out of operative position.

13. A portable device adapted to support electric welding control apparatus comprising a frame consisting of upper and lower members, means separating the frame members and adapted to adjust the separation between the frame members, handles pivotally secured to the separating means to swing in a horizontal plane and movable longitudinally of the separating means to engage holding means, and holding means to retain the handles in and out of operative position.

In testimony whereof I affix my signature.

WILLIAM P. BOVARD.